United States Patent
Doll

Patent Number: 5,383,357
Date of Patent: Jan. 24, 1995

[54] MASS AIR FLOW SENSOR DEVICE

[76] Inventor: John A. Doll, 7304 Greenlawn, Louisville, Ky. 40222

[21] Appl. No.: 169,069

[22] Filed: Dec. 20, 1993

[51] Int. Cl.$^6$ .......................... G01P 5/00; G01F 1/68
[52] U.S. Cl. ................................. 73/118.2; 73/202.5; 73/204.16
[58] Field of Search .................... 73/118.2, 861, 202, 73/204.11, 204.23, 204.25

[56] References Cited

U.S. PATENT DOCUMENTS

| | | | |
|---|---|---|---|
| 4,279,146 | 7/1981 | Wessel et al. | 73/118.2 |
| 4,400,974 | 8/1983 | Nishimura et al. | 73/118.1 |
| 4,416,149 | 11/1983 | Kitamura et al. | 73/118.2 |
| 4,478,076 | 10/1984 | Bohrer | 73/204.16 |
| 4,571,996 | 2/1986 | Wakeman et al. | 73/202.5 |
| 4,637,251 | 1/1987 | Carp | 73/118.2 |
| 4,739,656 | 4/1988 | Collins et al. | 73/204.16 |
| 4,771,632 | 9/1988 | Kubo | 73/118.2 |
| 4,807,151 | 2/1989 | Citron | 364/510 |
| 4,884,215 | 11/1989 | Zboralski et al. | 73/118.2 |
| 4,953,388 | 9/1990 | Barada | 73/37.5 |
| 5,207,094 | 5/1993 | Gmelin et al. | 73/118.2 |
| 5,243,858 | 9/1993 | Erskine et al. | 73/204.26 |

FOREIGN PATENT DOCUMENTS 3287018 12/1991 Japan .................... 73/118.2

Primary Examiner—Hezron E. Williams
Assistant Examiner—James M. Olsen
Attorney, Agent, or Firm—Maurice L. Miller, Jr.

[57] ABSTRACT

A mass air flow sensor device for determining the mass of air flowing therethrough is operatively associated with an engine control module of an internal combustion engine which uses data corresponding to the mass of air flowing to the engine for controlling the operation of the engine for increased efficiency and lower exhaust emissions. The mass air flow sensor device includes a housing having an air flow-through housing comprising an electrically resistant air temperature sensing element at the air inlet end of the housing and an electrically resistant air heating element in the housing downstream of the air temperature sensing element. The resistor of the air temperature sensing element and the resistor of the air heating element are components of a common electrical circuit. The air heating element is operatively responsive to the temperature of the incoming air as sensed by the air temperature sensing element so that the air heating element is heated to a predetermined temperature increment above the temperature of the air as sensed by the air temperature sensing element. The power dissipated in maintaining the air heating element at the predetermined temperature increment is proportional to the mass of the air flow through the housing. The value of the dissipated power is transmitted to the engine control module to be used to control the operation of the engine.

12 Claims, 1 Drawing Sheet

MASS AIR FLOW SENSOR DEVICE

BACKGROUND OF THE INVENTION

The present invention relates to devices for determining the mass of a stream of air, and more particularly to a mass air flow sensor device for determining the mass of air flowing therethrough to control the operation of an internal combustion engine.

Mass air flow sensor devices for determining the mass of air flowing therethrough to control the operation of an internal combustion engine are per se known.

An object of the present invention is to provide a mass air flow sensor device with has a longer operational life than the heretofore known air flow sensor devices.

It is another object of the present invention to provide an air flow sensor device which is more reliable in operation than the heretofore known air flow sensor devices.

It is a further object of the present invention to provide an air flow sensor device having an ambient air temperature sensor element and an air heating element responsive to the temperature of the ambient air temperature as sensed by the air temperature sensor element, which air heating element is more quickly responsive to the air temperature sensor element than in heretofore known air flow sensor devices.

SUMMARY OF THE INVENTION

The present invention provides a mass air flow sensor for determining the mass of air flowing therethrough to control the operation of an internal combustion engine, comprising (a) a housing defining a converging-diverging air flow-through passage from an air inlet opening at one end of the housing to an outlet opening at the other end of the housing; (b) an electronic fixed negative side wheatstone bridge circuit comprising: an air heating resistor element in a first arm of the bridge circuit, the air heating resistor element being located at the throat of the air flow-through passage; an air temperature sensing thermistor in a third arm of the bridge circuit, the thermistor being located in the air flow-through passage proximate the air inlet opening; a first fixed value resistor in a second arm of the bridge circuit; a second fixed value resistor in a fourth arm of the bridge circuit; a voltage input applied to the juncture of the first and third arms of the bridge circuit; and a first voltage output from the juncture of the first and fourth arms of the bridge circuit to an engine control module controlling the operation of the internal combustion engine.

BRIEF DESCRIPTION OF THE DRAWING

A better understanding of the present invention will be had upon reference to the accompanying drawing wherein like numerals refer to like components throughout the several views and in which.

DETAILED DESCRIPTION OF THE PREFERRED EMBODIMENT

Figure 1:
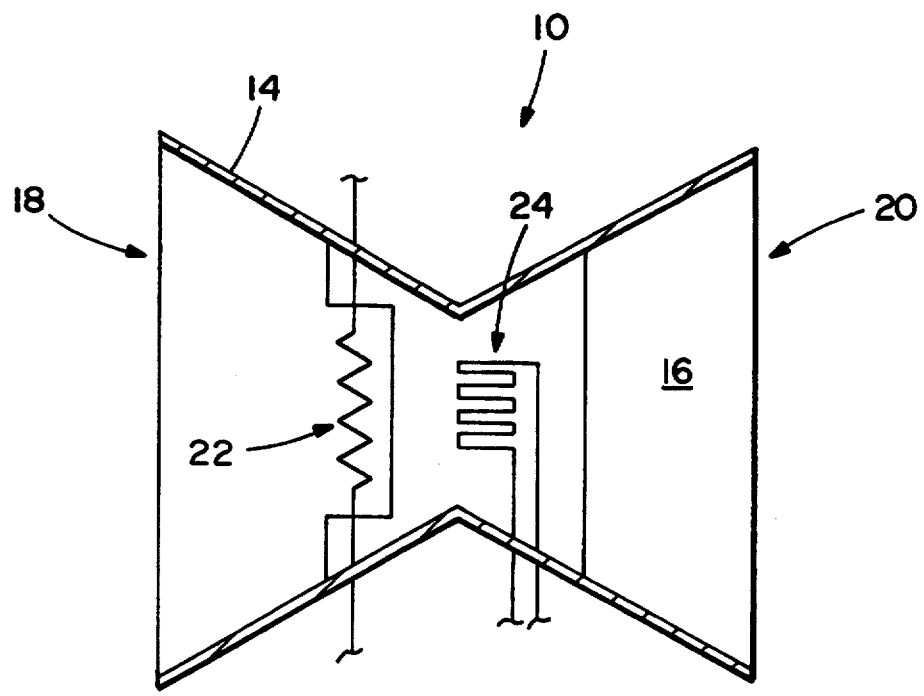
FIG. 1 is a schematic cross-sectional view of a mass air flow sensor device embodying the features of the present invention; and, FIG. 2 is a schematic of the electrical system of the air flow sensor device embodying the present invention.
Figure 2:
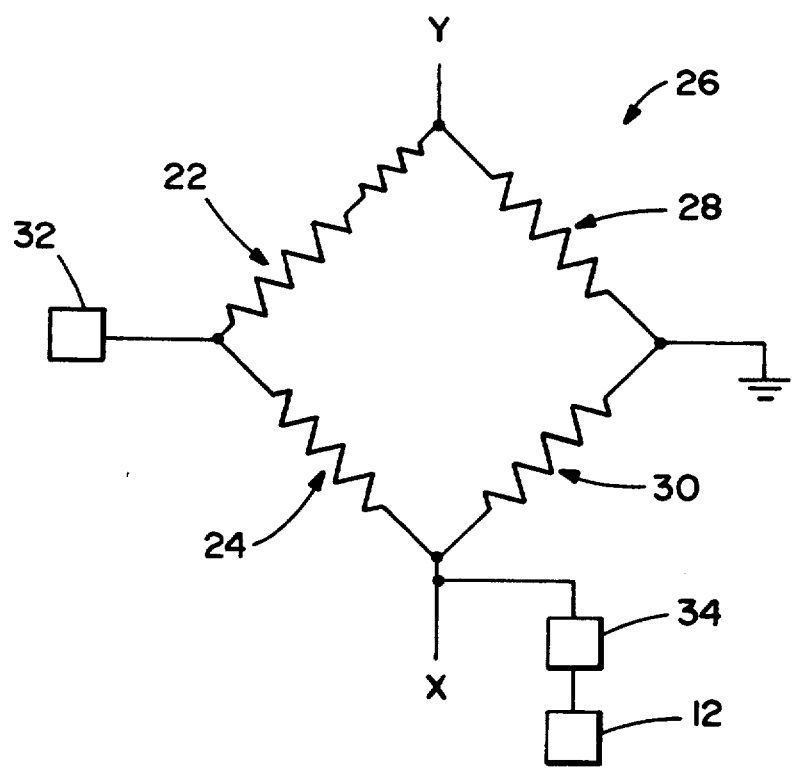

With reference to FIGS. 1 and 2, there is shown a mass air flow sensor device, generally denoted as the numeral 10, of the present invention for determining the mass of air flowing therethrough. The air flow sensor device 10 is operatively associated with an engine control device 12, such as an engine control module or computer which uses data corresponding to the mass of air flowing through the mass air flow sensor device 10 to control the operation of the engine to increase efficiency and reduce exhaust air pollutants, for example.

The mass air flow sensor device 10 comprises a housing 14 defining a converging-diverging air flow-through passage 16 from an air inlet opening 18 at one end of the housing to an air outlet opening 20 at the other end of the housing 14.

Ambient air temperature sensor means 22 is located in and centered on the air flow-through passage 16 proximate the air inlet opening 18 for sensing the temperature of the air flowing into the air flow-through passage 16 through the air inlet opening 18. The air temperature sensor means 22 consists of a positive temperature coefficient thermistor having a linear resistance-to-temperature curve.

Air heating means 24 is located in the air flow-through passage 16 downstream of the air temperature sensor means 22. The air heating means 24 heats the air flowing in the air flow-through passage 16 downstream of the first sensing means 22 to a predetermined temperature above the temperature of the air sensed by the air temperature sensing means 22. In a preferred embodiment, the air heating means 24 is maintained at a constant temperature increment of about 75 degrees C. above the temperature of the air sensed by the air temperature sensor means 22. The air heating means 24 comprises a metal foil which functions as a resistor. The metal foil means 24 is located on the centerline of and at the throat of the converging-diverging housing 14.

With reference to FIG. 2, the air temperature sensor thermistor 22 and the air heating metal foil 24 are components of an electronic fixed negative side Wheatstone bridge circuit, generally denoted as the numeral 26. The bridge circuit 26 consists of four resistors connected in series and parallel forming the four arms of the bridge. The air heating metal foil 24 is in the first arm of the side bridge circuit 26, and the air temperature sensor thermistor 22 is in the third arm. A first fixed value resistor 28 is in the second arm, and another or second fixed value resistor 30 is in the fourth arm. A voltage input 32 is connected or applied to the juncture of first arm having the air heating metal foil 24 and third arm having the air temperature sensor thermistor 22, the ground is connected or associated with the juncture of the second arm having the first resistor 28 and the fourth arm having the second resistor 30.

In operation, the ambient inlet air passing into the housing 14 through the air inlet opening 18 first passes over the air temperature thermistor 22 causing the resistance of the air temperature thermistor 22 to change. The amount of change of resistance of the thermistor 22 is a function of the temperature of the ambient air, i.e., the higher the temperature of the ambient inlet air the greater the resistance provided by the air temperature thermistor 22. The air then flows over the air heating metal foil 24 whereupon the air adsorbs heat from the air heating metal foil 24. The values of the fixed value resistors 28 and 30 are chosen to cause the air heating metal foil 24 to be heated to a predetermined temperature increment above the air temperature sensed by the air temperature sensor thermistor 22. The voltage outputs X and Y provide feedback to the voltage input 32 to maintain the wheatstone bridge 26 in balance. The power dissipated by the air heating foil 24 is proportional to the mass of air flowing through the housing 14.

Depending upon the operating parameters of the engine control module (computer) 12, the voltage at the output X of the circuit (corresponding to the power required in maintaining the air heating foil 24 at a predetermined temperature increment above the temperature of the incoming air as sensed by the air temperature sensor thermistor 22 which is proportional to the mass of the air flow) may have to be conditioned and converted to a frequency using a voltage controlled oscillator, or conditioned to give the output voltage a different range by voltage conditioning means 34 in the first voltage output.

The foregoing detailed description of the present invention is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. A mass air flow sensor for determining the mass of air flowing therethrough to control the operation of an internal combustion engine, comprising:
 a) a housing defining a converging-diverging air flow-through passage from an air inlet opening at one end of the housing to an air outlet opening at the other end of the housing;
 b) an electronic fixed negative side wheatstone bridge circuit comprising:
  an air heating resistor element in a first arm of the bridge circuit, the air heating resistor element being located at the throat of the air flow-through passage;
  an air temperature sensing thermistor in a third arm of the bridge circuit, the thermistor being located in the air flow-through passage proximate the air inlet opening;
  a first fixed value resistor in a second arm of the bridge circuit;
  a second fixed value resistor in a fourth arm of the bridge circuit;
  a voltage input applied to the juncture of the first and third arms of the bridge circuit; and,
  a first voltage output from the juncture of the first and fourth arms of the bridge circuit to an engine control module controlling the operation of the internal combustion engine.

2. The mass air flow sensor of claim 1, further comprising:
 a second voltage output interconnecting the juncture of the second and third arms to the voltage input;
 the first voltage output interconnecting the junction of the first and fourth arms to the voltage input;
 the first and second voltage outputs providing a feedback to the voltage input to maintain the wheatstone bridge circuit in balance.

3. The mass air flow sensor of claim 1, wherein the amount of change of resistance of the air temperature sensing thermistor is a function of the temperature of the ambient inlet air flowing through the inlet into the passage of the housing.

4. The mass air flow sensor of claim 3, wherein the air temperature sensing thermistor comprises a positive temperature coefficient thermistor having a linear resistance-to-temperature curve.

5. The mass air flow sensor of claim 1, wherein the values of the first and second fixed value resistors are chosen to cause the air heating resistor element to be heated to a predetermined temperature increment above the temperature sensed by the air temperature sensing thermistor.

6. The mass air flow sensor of claim 5, wherein the voltage at the first voltage output of the bridge circuit corresponds to the power dissipated for maintaining the air temperature heating resistor element at the predetermined temperature increment.

7. The mass air flow sensor of claim 5, wherein the predetermined temperature increment is about 75 degrees C.

8. The mass air flow sensor of claim 1, wherein the air heating resistor element comprises a metal foil.

9. The mass air flow sensor of claim 8, wherein said element is planar and is located in a plane parallel to the flow of air through the air flow-through passage.

10. The mass air flow sensor of claim 1, wherein the electrical power dissipated by the air temperature heating resistor element is proportional to the mass of air flowing through the housing.

11. The mass air flow sensor of claim 1, further comprising voltage conditioning means in the first voltage output for converting the voltage to a frequency signal.

12. The mass air flow sensor of claim 1, further comprising voltage conditioning means in the first voltage for converting the output voltage to a different value range.

* * * * *